US008804144B2

(12) United States Patent
Tsuya

(10) Patent No.: US 8,804,144 B2
(45) Date of Patent: Aug. 12, 2014

(54) METHOD TO READ IMAGES AND COMPUTER READABLE STORAGE MEDIUM THEREFOR

(75) Inventor: Seiji Tsuya, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 932 days.

(21) Appl. No.: 12/730,759

(22) Filed: Mar. 24, 2010

(65) Prior Publication Data

US 2010/0245879 A1 Sep. 30, 2010

(30) Foreign Application Priority Data

Mar. 30, 2009 (JP) ................................ 2009-083161

(51) Int. Cl.
*G06F 3/12* (2006.01)
*G06K 15/00* (2006.01)
*H04N 1/00* (2006.01)
*H04N 1/387* (2006.01)
*H04N 1/04* (2006.01)
*H04N 1/46* (2006.01)

(52) U.S. Cl.
USPC ........ 358/1.13; 358/1.15; 358/1.16; 358/403; 358/450; 358/474; 358/540

(58) Field of Classification Search
USPC ............. 358/1.13, 1.6, 3.22, 3.23, 1.15, 1.16, 358/1.17, 403, 405, 407, 434, 435, 444, 358/450, 436, 438, 474, 540
See application file for complete search history.

(56) References Cited

U.S. PATENT DOCUMENTS

| | | | |
|---|---|---|---|
| 6,982,811 B2 * | 1/2006 | Sato ................................ 358/1.4 |
| 7,199,907 B2 * | 4/2007 | Shimizu ......................... 358/448 |
| 7,930,307 B2 * | 4/2011 | Igari ............................. 707/755 |
| 8,115,950 B2 * | 2/2012 | Du et al. ....................... 358/1.15 |
| 2006/0268362 A1 * | 11/2006 | Bridges et al. ................. 358/450 |
| 2007/0121148 A1 | 5/2007 | Sugimoto et al. |
| 2008/0018952 A1 | 1/2008 | Du et al. |

FOREIGN PATENT DOCUMENTS

| | | |
|---|---|---|
| JP | HEI5-300284 | 11/1993 |
| JP | 2002-152431 | 5/2002 |
| JP | 2007-150567 A | 6/2007 |
| JP | 2007-311915 | 11/2007 |

OTHER PUBLICATIONS

Notification of Reasons for Rejection dated Sep. 20, 2011 received from the Japanese Patent Office from related Japanese Application No. 2010-067668, together with an English-language translation.

* cited by examiner

*Primary Examiner* — Firmin Backer
*Assistant Examiner* — Jonathan Beckley
(74) *Attorney, Agent, or Firm* — Scully, Scott, Murphy & Presser, P.C.

(57) ABSTRACT

A method to create a data file in a controller device connected to an image reading apparatus is provided. The method includes receiving an event signal generated in the image reading apparatus based on an instruction, obtaining image data according to receipt of the event signal, judging whether the received event signal is a first event signal in a first operation mode, setting the controller device to operate in a second operation mode, releasing the controller device from the second operation mode when a terminating event occurs, judging whether the received event signal being a non-first event signal is a continuing event signal, and adding the image data obtained according to the non-first event signal being a continuing event signal to the image data obtained according to the first event signal to create a single multiple-paged file when a terminating event occurs.

7 Claims, 4 Drawing Sheets

METHOD TO READ IMAGES AND COMPUTER READABLE STORAGE MEDIUM THEREFOR

CROSS REFERENCE TO RELATED APPLICATION

This application claims priority from Japanese Patent Application No. 2009-083161, filed on Mar. 30, 2009, the entire subject matter of which is incorporated herein by reference.

BACKGROUND

1. Technical Field

An aspect of the present invention relates to a method to read images and a computer readable storage medium therefor.

2. Related Art

An image reading apparatus, which is connected with an external device such as a personal computer, to read an image formed on a recording medium is known. The image reading apparatus can read the image by a scanner unit when an instruction to read the image is entered through a key provided in an input device of the image reading apparatus. The image having been read is converted into image data, and the image data can be transmitted to the external device through, for example, a network.

SUMMARY

When images formed on unbound loose sheets of paper are read by the image reading apparatus, the sheets can be fed to the scanner unit one by one by an automatic document feeder (ADF). However, when images formed on bound pages of paper (e.g., a book) are read, the pages cannot be fed one by one by the ADF; therefore, a user needs to repeat setting the book with the pages including the desired image open on a flatbed of the scanner unit to have the images scanned page by page. Meanwhile, the image reading apparatus creates a data file containing image data for an image read in a single reading operation when the image is read through the flatbed. Thus, when the images in multiple pages are scanned in a plurality of reading operations, a plurality of data files are created. In other words, a data file containing continuous multiple pages of images cannot be generated.

In consideration of the above inconvenience, the present invention is advantageous in that a method to read images formed on a plurality of pages in multiple reading operations and automatically generate a file containing multiple pages of images is provided. Further, a computer readable storage medium therefor is provided.

According to an aspect of the present invention, a method to create a data file containing image data in a controller device connected to an image reading apparatus, which reads an image formed on a recording medium and generates image data representing the image on basis of an instruction from a user, is provided. The method includes receiving an event signal generated in the image reading apparatus based on the instruction and transmitted to the controller device, obtaining the image data generated in the image reading apparatus on the basis of the instruction from the image reading apparatus according to the receipt of the event signal, judging as to whether the received event signal is a first event signal in the controller device operating in a first operation mode, setting the controller device to operate in a second operation mode when judgment is made that the received event signal is a first event signal, releasing the controller device from the second operation mode when a terminating event occurs, storing the image data obtained from the image reading apparatus according to the receipt of the first event signal in a storage area, judging, when the received event signal is a non-first event signal in the controller device, operating in the second operation mode, as to whether the received non-first event signal is a continuing event signal, which is an event signal continuous from the first event signal, and adding, when judgment is made that the received non-first event signal is a continuing event signal, the image data obtained from the image reading apparatus according to the receipt of the non-first event signal to the image data previously obtained from the image reading apparatus according to the receipt of the first event signal and stored in the storage area to create a single multiple-paged file containing the image data obtained according to the receipt of the first event signal and the image data obtained according to the receipt of the non-first event signal.

According to the above method, when the first event signal generated according to the instruction entered in the image reading apparatus is received in the controller device, the second operation mode, in which the judgment as to whether a non-first event signal is a continuing event signal can be made, is automatically activated. Therefore, the user is not required to stay in the vicinity of the controller device, but may stay in the vicinity of the image reading apparatus to operate the image reading apparatus. Further, the image reading apparatus, even without a user interface device through which the user can enter a terminating instruction to terminate continuous reading operations, can be used to create the multiple-paged file. Furthermore, no firmware to modify configuration of the image reading apparatus to create the multiple-paged file is required. Accordingly, the multiple-paged file including image data, which represents a plurality of images read in a plurality of reading operations, can be created in a less complicated manner.

According to another aspect of the present invention, a computer readable medium storing computer readable instructions to manipulate a controller device is provided. The controller device is connected to an image reading apparatus to read an image formed on a recording medium and generate image data representing the image on basis of an instruction from a user. The instructions manipulate the controller device to create a data file containing the image data. The instructions include steps of receiving an event signal generated in the image reading apparatus based on the instruction and transmitted to the controller device, obtaining the image data generated in the image reading apparatus on the basis of the instruction from the image reading apparatus according to the receipt of the event signal, judging as to whether the received event signal is a first event signal in the controller device operating in a first operation mode, setting the controller device to operate in a second operation mode when judgment is made that the received event signal is a first event signal, releasing the controller device from the second operation mode when a terminating event occurs, storing the image data obtained from the image reading apparatus according to the receipt of the first event signal in a storage area, judging, when the received event signal is a non-first event signal in the controller device, operating in the second operation mode, as to whether the received non-first event signal is a continuing event signal, which is an event signal continuous from the first event signal, and adding, when judgment is made that the received non-first event signal is a continuing event signal, the image data obtained from the image reading apparatus according to the receipt of the non-first event signal to the image data previously obtained from the image reading apparatus according to the receipt of the first event signal and stored in the storage area to create a single multiple-paged file containing the image data obtained according to the receipt of the first event signal and the image data obtained according to the receipt of the non-first event signal.

According to the above computer readable storage medium, the controller device can be manipulated such that, when the first event signal generated according to the instruction entered in the image reading apparatus is received in the controller device, the second operation mode, in which the judgment as to whether a non-first event signal is a continuing event signal can be made, is automatically activated. Therefore, the user is not required to stay in the vicinity of the controller device, but may stay in the vicinity of the image reading apparatus to operate the image reading apparatus. Further, the image reading apparatus, even without a user interface device through which the user can enter a terminating instruction to terminate continuous reading operations, can be used to create the multiple-paged file. Furthermore, no firmware to modify configuration of the image reading apparatus to create the multiple-paged file is required. Accordingly, the multiple-paged file including image data, which represents a plurality of images read in a plurality of reading operations, can be created in a less complicated manner.

BRIEF DESCRIPTION OF THE ACCOMPANYING DRAWINGS

DETAILED DESCRIPTION

Hereinafter, an embodiment according to the present invention will be described with reference to the accompanying drawings.

Figure 1:
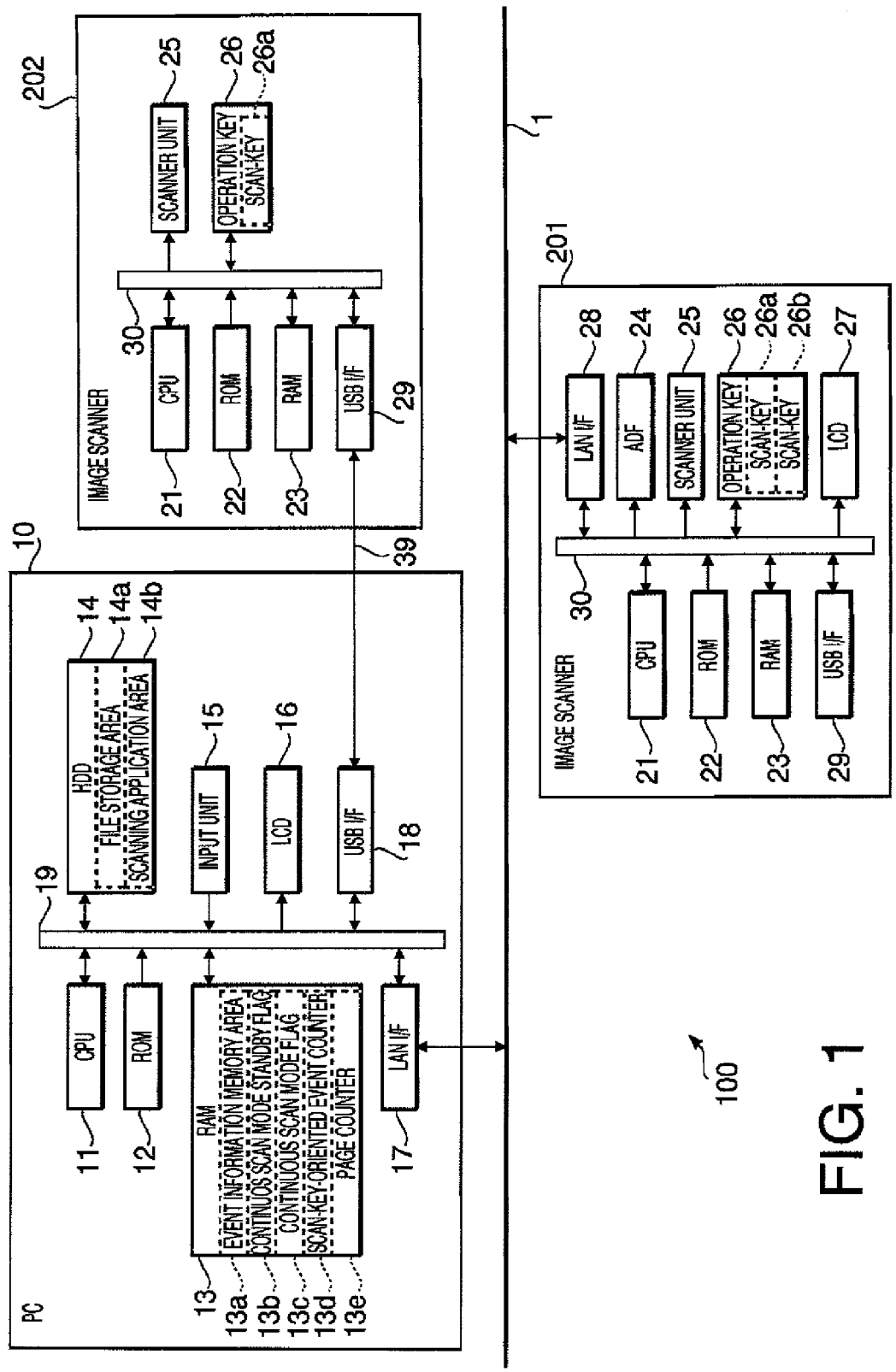
FIG. 1 is a block diagram to illustrate an image reading system 100 having a personal computer (PC) 10 and image scanners 201, 202 according to an embodiment of the present invention.

Electric configuration of the image reading system 100 including the PC 10 and the image scanners 201, 202 will be described with reference to FIG. 1. The PC 10 is connected with the image scanner 201 through a local area network (LAN) 1 and with the image scanner 202 through a universal serial bus (USB) 39. The PC 10 can control operations of the image scanners 201, 202 through the LAN 1 and the USB 39 respectively. It is to be noted that the image reading system 100 may include more than one PC 10, the image scanner 201, and the image scanner 202 respectively, although in the present embodiment, as shown in FIG. 1, the single PC 10, the single image scanner 201, and the single image scanner 202 are illustrated.

The PC 10 in the image reading system 100 can create a data file which includes image data representing an image formed on a sheet of recording medium upon receipt of a scan-key-oriented event, which is a signal generated based on a user's operation to one of scan keys 26a, 26b of the image scanner 201 and a scan key 26a of the image scanner 202. Further, the PC 10 can create a data file which includes image data representing multiple-paged images under control of an image scanning application program based on images read by the image scanners 201, 202 upon receipt of a plurality of scan-key-oriented events transmitted from the image scanners 201, 202. The data file which includes image data representing multiple-paged images will be hereinafter referred to as a "multiple-paged file" in the present embodiment. The behaviors of the PC 10 to create the multiple-paged file will be described later in detail.

The PC 10 is provided with a CPU 11, a ROM 12, a RAM 13, a hard disk drive (HDD) 14, an input unit 15 including a keyboard and a mouse (not shown), a display unit including a liquid crystal display (LCD) 16, a LAN interface (LAN I/F) 17, through which the PC 10 is connected with the LAN 1, and a USB interface (USB I/F) 18, through which the PC 10 is connected with an external device (e.g., the image scanner 202). These components are connected with one another through a system bus 19 within the PC 10.

Thus, the PC 10 is connected to the image scanner 201 to communicate through the LAN 1 and to the image scanner 202 to communicate through the USB 39.

The CPU 11 is a microprocessor to activate and execute the programs stored in storage devices such as the ROM 12 and the HDD 14. The ROM 12 is a read-only memory, which stores various programs and information (e.g., constant numbers and tables) to be used in the programs. The RAM 13 is a readable-writable memory including a work area, which stores temporal information (e.g., variable numbers) to be used in the programs.

The RAM 13 includes areas for event information memory 13a, a continuous scan mode standby flag 13b, a continuous scan mode flag 13c, a scan-key-oriented event counter 13d, and a page counter 13e.

The event information memory 13a includes event information, which is information included in scan-key-oriented events generated according to a user's input through scan keys 26a, 26b. The event information includes identifying information to identify the image scanner 201/202 which is an origin to transmit the signals indicating the scan-key-oriented events. In the image reading system 100 according to the present embodiment, as shown in FIG. 1, information identifying the image scanner 201 or the image scanner 202 is included in the event information. The event information further includes information concerning a type of the scan-key-oriented event. The scan-key-oriented events can be categorized into two types, which are; an event activated by an operation to a scan key 26a and an event activated by an operation to a scan key 26b.

The continuous scan mode standby flag 13b is a flag to indicate operation status of the PC 10. In particular, the continuous scan mode standby flag 13b indicates as to whether the PC 10 is operating in a standby mode, in which the PC 10 stands by to be shifted into a continuous scan mode. The continuous scan mode standby flag 13b is set to one (1) when the PC 10 receives the scan-key-oriented event. The PC 10 receiving the scan-key-oriented event is thus shifted into the standby mode. The continuous scan mode standby flag 13b set to 1 is cleared to zero (0) when a predetermined time period (e.g., 2 minutes) elapses or when predetermined input by a user is entered. According to the continuous scan mode standby flag 13b cleared to zero, the PC 10 is released from the standby mode and exits the standby mode.

The continuous scan mode flag 13c is a flag to indicate operation status of the PC 10. In particular, the continuous scan mode flag 13c indicates as to whether the PC 10 is operating in the continuous scan mode, in which the PC 10 processes a plurality of continuous scan-key-oriented events, and the continuous scan mode is activated when a scan-key-oriented event transmitted from the image scanner 201 or the image scanner 202 is one of continuing scan-key-oriented events, which are continuous from a previous scan-key-oriented event.

The scan-key-oriented event counter 13 counts a quantity of continuing scan-key-oriented events. The page counter 13e counts a quantity of sheets having been scanned by the image scanner 201/202 which transmitted the scan-key-oriented events activated by the scan keys 26a, 26b.

The HDD 14 is a readable-writable data storage to store data files and various programs to be executed in the PC 10. The HDD 14 according to the present embodiment includes a file memory area 14a and an area for scanning applications 14b. The file memory area 14a is an area to store data files created in a scanner controlling operation, which will be described later in detail with reference to FIG. 2.

The scanning application area 14b is an area to store application programs to drive the image scanners 201, 202. The application programs are installed in the scanning application area 14b of the PC 10 by the user. Operations illustrated in FIGS. 2-4A, which will be described later in detail, are executed according to the application programs.

The HDD 14 further includes an area (not shown) to store an operating system (OS), which controls behaviors of the PC 10. According to the present embodiment, Windows (registered trademark) OS is employed in the PC 10; however, the OS to control the PC 10 is not limited to Windows OS, but may be other operating system as long as an equivalent scan-controlling operation can be performed in the PC 10.

Further, in the HDD 14, various programs to control the PC 10 to function in cooperation with the OS are installed in predetermined areas. The programs include, for example, TWAIN data source, STI (Still Image) driver, WIA (Windows Image Acquisition) driver, and event monitors.

The STI driver is created particularly to work in cooperation with Windows OS and enables data communication between the TWAIN data source, which is an image processing driver to receive raster data provided by the image scanners and supply the received raster data to the application program, and the image scanners. The STI driver and paired TWAIN data source constitute driver software for the image scanners.

The WIA driver is created particularly to work in cooperation with Windows OS and enables data communication between the WIA driver itself and the image scanners. The WIA driver is also an image processing driver to receive the raster data provided by the image scanners 201, 202 and supply the received raster data to the application program.

The event monitor is a software program to monitor operations in the image scanners 201, 202 through the STI driver or the WIA driver. The event monitor detects predetermined behaviors of the image scanners 201, 202 when the behaviors are caused in the image scanners 201, 202 according to the user's input. The event monitor further executes operations (e.g., activates an application program) according to the detected events.

In the present embodiment, when the user operates the scan keys 26a, 26b of the image scanners 201, 202, the STI driver or the WIA driver receives the information concerning the operated scan keys and notifies the event monitor of the scan-key-oriented event and a type of the event. The event monitor receiving the information activates an application program according to a name of the image scanner having the operated scan key and the type of the event notified by the STI driver or the WIA driver. Accordingly, a scanner controlling process, which will be described later in detail, is activated in the PC 10.

The image scanner 201 is provided with a CPU 21, a ROM 22, a RAM 23, an automatic document feeder (ADF) 24, a scanner unit 25, operation keys 26 being an input unit, an LCD 27, a LAN I/F 28, and a USB I/F 29. These components are connected with one another through a system bus 30 within the image scanner 201. The image scanner 201 is connected to the LAN 1 through the LAN I/F 28.

The scanner unit 25 reads an image formed on a surface of a document sheet, which is placed on a document platen (not shown) or fed by the ADF 24, to generate image data representing the image. The scanner unit 25 includes a line sensor (not shown) to read the image in lines and a drive mechanism (not shown) to move the line sensor in an auxiliary direction.

The operation keys 26 include a scan key 26a and a scan key 26b, which are keys to be operated by a user in order to enter an instruction to read the image on the document sheet in the image scanner 201. The scan keys 26a, 26b are selectively operated according to usage of the image data to be generated in the scanning operation. In particular, the scan key 26a is operated in order to instruct the image scanner 201 to read the image, generate image data representing the read image, and store the image data in the file memory 14a in the PC 10. Meanwhile, the scan key 26b is operated in order to instruct the image scanner 201 to read the image, generate image data representing the read image, and create an e-mail with the image data attached thereto.

The image scanner 202 is in a configuration similar to the image scanner 201, but some of the components in the image scanner 201 are omitted. The image scanner 202 is provided with a CPU 21, a ROM 22, a RAM 23, a scanner unit 25, and an operation key 26 including a scan key 26a, an LCD 27, a USB I/F 29, which are similar to those in the image scanner 201. However, the operation key 26 in the image scanner 202 does not include a scan key 26b. These components are connected with one another with a system bus 30 within the image scanner 202. Description of these components in the image scanner 202 similar to those in the image scanner 201 will be herein omitted.

Figure 2:
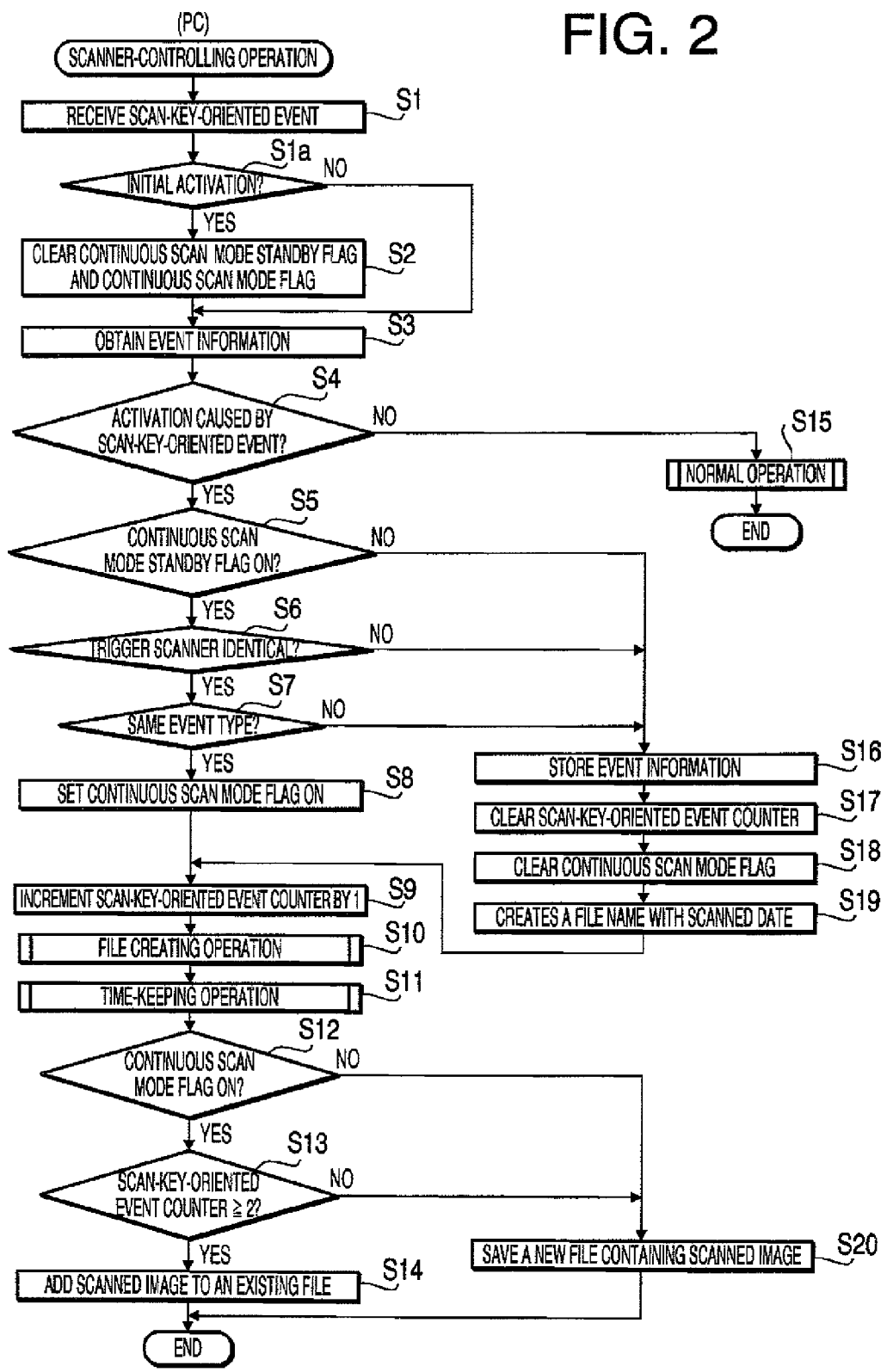
FIG. 2 is a flowchart to illustrate a scanner controlling operation in the PC 10 according to the embodiment of the present invention.

Next, a flow of a seamier controlling operation to be executed by the CPU 11 in the PC 10 according to a scanning application program in the present embodiment will be described with reference to FIG. 2.

The scanner controlling operation starts in the PC 10 when the application program is activated upon receipt of a scan-key-oriented event, which is generated on basis of an instruction by the user through one of the scan keys 26a, 26b in the image scanner 201 or through the scan key 26a in the image scanner 202. The scanner controlling operation can be as well started according to the user's input, which generates a signal equivalent to the scan-key-oriented event, directly to the PC 10 through the input unit 15.

When, in S1, the operation starts upon receipt of the scan-key-oriented event, in S1a, it is examined as to whether the activation of the application is initial activation. If the application program is initially activated (S1a: YES), in S2, the continuous scan mode standby flag 13b and the continuous scan mode flag 13c are cleared to zero. The flow proceeds to S3. In S1a, if the activation is not initial activation (S1a: NO), the flow skips S2 and proceeds to S3.

In S3, event information is extracted from the scan-key-oriented event. The event information includes information concerning a trigger which has activated the application program. Namely, the event information indicates the activation of the application program in the PC 10 is triggered by the user's input through one of the scan key 26a, the scan key 26b (i.e. receipt of a scan-key-oriented event) or by the user's input to the PC 10. When the application program was activated by receipt of the scan-key-oriented event, the event information includes a name of the image scanner, which has issued the scan-key-oriented event, and a type of the event. The image scanner issuing a scan-key-oriented event will be hereinafter referred to as a "trigger scanner." When the application program was activated by an operation to one of the scan key 26a and the scan key 26b, the event information is passed to the application program according to a command line prepared by the event monitor and received by the CPU 11 of the PC 10. In this regard, the OS in the PC 10 is provided with an application program interface (API), which provides the event information in response to an inquiry; therefore, the CPU 11 may inquire for the event information at the API and obtain the event information provided by the API in return.

In S4, it is examined, based on the event information obtained in S3, as to whether the application program was activated by receipt of a scan-key-oriented event. If the application program was not activated by receipt of a scan-key-oriented event (S4: NO), it is determined that the application program was activated by the user's input directly to the PC 10; therefore, in S15, the CPU 11 controls one of the image scanners 201, 202 in a normal operation as instructed. The flow ends thereafter.

In S4, if the application program was activated by receipt of a scan-key-oriented event (S4: YES), in S5, it is examined with reference to the continuous scan mode standby flag 13b as to whether the PC 10 is operating in the standby mode.

In S5, if the continuous scan mode standby flag 13b is cleared to zero, it indicates that the PC 10 is not operating in the standby mode (S5: NO). Therefore, in S16, the CPU 11 stores the event information obtained in S3 in the event information memory 13a. Further, in S17, the CPU 11 clears the scan-key-oriented event counter 13d to zero. In S18, the CPU 11 clears the continuous scan mode flag 13c to zero, and in S19, the CPU 11 creates a filename which includes, for example, current date and time obtained from a real time clock (not shown).

In the present embodiment, the continuous scan mode standby flag 13b is set to 1 in a time-keeping operation (see FIG. 4B) activated in S11 following a scanning operation in S10, which will be described later in detail. Therefore, if the CPU 11 detects that the continuous scan standby mode flag 13b is zero in S5 (S5: NO), it indicates that the currently running scanner controlling operation is activated by an independent single scan-key-oriented event or a first scan-key-oriented event amongst a plurality of continuous scan-key-oriented events, rather than a scan-key-oriented event which follows the first scan-key-oriented event. In the present embodiment, hereinafter, the independent single scan-key-oriented event and the first scan-key-oriented event amongst a plurality of continuous scan-key-oriented events will be referred to as a first scan-key-oriented event.

In S5, if the CPU 11 detects that the continuous scan standby mode flag 13b is set to 1 (S5: YES), it indicates that the currently running scanner controlling operation is activated by a follower scan-key-oriented event, which is a scan-key-oriented event secondly or later received following a preceding first scan-key-oriented event amongst plurality of continuously received scan-key-oriented events. In the present embodiment, the follower scan-key-oriented event secondly or later received following a preceding first scan-key-oriented event in the standby mode will be referred to as a second scan-key-oriented event.

If the continuous scan standby mode flag 13b is set to 1 (S5: YES), in S6, it is examined as to whether the trigger scanner of the scan-key-oriented event activating the current scanner controlling operation is identical to a trigger scanner of the preceding first scan-key-oriented event activating. Further, in S7, it is examined as to whether an event type of the current scan-key-oriented event and an event type of the preceding first scan-key-oriented event are identical. The identities of the trigger scanners and the event types are examined in S6 and S7 based on the event information obtained in S3 and the event information stored in the event information memory 13a in S16 upon receipt of the preceding first scan-key-oriented event.

In S6, if the CPU 11 detects that the trigger scanner of the current scan-key-oriented event is different from the trigger scanner of the preceding first scan-key-oriented event (S6: NO), it is determined that the current scan-key-oriented event is a first scan-key-oriented event. The flow proceeds to S16. If the CPU 11 detects that the trigger scanners are identical (S6: YES) but finds that the event type of the current scan-key-oriented event is different from the event type of the preceding first scan-key-oriented event in S7 (S7: NO), it is determined that the current scan-key-oriented event is a first scan-key-oriented event. The flow proceeds to S16.

In S6, if the CPU 11 detects that the trigger scanners are identical (S6: YES) and, in S7, finds that the event types of the current scan-key-oriented event and the preceding first scan-key-oriented event are identical (S7: YES), it is determined that the second scan-key-oriented event is a continuing scan-key-oriented event, which is continuous from the preceding first scan-key-oriented event. Therefore, in S8, the CPU 11 sets the continuous scan mode flag 13c to 1. Accordingly, the PC 10 is shifted into the continuous scan mode. The flow proceeds to S9.

In S9, the CPU 11 increments the scan-key-oriented event counter 13d by 1. According to the present embodiment, when the currently running scanner controlling operation was activated by receipt of a first scan-key-oriented event, i.e., S9 is performed according to the negative judgment in S5 (S5: NO) and following S16-S19, the scan-key-oriented event counter 13d is cleared to zero in S17. Therefore, a value in the scan-key-oriented event counter 13d is incremented to 1. Meanwhile, when the currently running scanner controlling operation was activated by receipt of one of second scan-key-oriented events continuous from the preceding first scan-key-oriented event, i.e., S9 is performed according to the affirmative judgment in S5 (S5: YES), in S7 (S7: YES), and in S8 (S8: YES), the value in the scan-key-oriented event counter 13d is incremented to 2 or more.

Following S9, in S10, the CPU 10 manipulates the trigger scanner, which is one of the image scanners 201, 202, to read the images on the document sheet in the scanning operation. Behaviors of the CPU 10 in the scanning operation will be described later in detail. In this regard, image data representing a scanned image is reserved in a temporary file, which is stored in the RAM 13.

Following the scanning operation, in S11, the CPU 10 activates the time-keeping operation, which will be described later in detail, to set and clear the continuous scan mode standby flag 13b. In this regard, if the time-keeping operation has been active, no additional time-keeping operation is activated in S11.

Following the time-keeping operation, in S12, the CPU 10 examines as to whether the continuous scan mode flag 13b is set to 1. If the continuous scan mode flag 13b is not set to 1 (S12: NO), in S20, the temporary file reserved in the RAM 13 in the scanning operation (S10) is saved as a new file and stored in the file memory 14a. The scanner controlling operation ends thereafter.

In S12, if the continuous scan mode flag 13b is set to 1 (s12: YES), in S13, the CPU 11 refers to the scan-key-oriented event counter 13d to find as to whether the counter indicates 2 or a larger number. If the counter indicates 1 (S13: NO), the flow proceeds to S20.

In S13, if the counter indicates 2 or a larger number (S13: YES), in S14, the temporary file reserved in the RAM 13 in the scanning operation (S10) is added to an existing data file, which is stored in the file memory 14a in S20, to be saved as a multiple-paged file. The scanner controlling operation ends thereafter.

According to the scanner controlling operation, as has been described above, when a scan-key-oriented event received in the PC 10 operating in the standby mode, in which the PC 10 stands by to be shifted in the continuous scan mode, and when the received second scan-key-oriented event is a continuing scan-key-oriented event continuous from a preceding first scan-key-oriented event, image data generated according to the continuous scan-key-oriented event is saved in a multiple-paged file. Thus, a multiple-paged file including image data to represent a plurality of pages of images can be generated.

In the scanner controlling operation, in S14, the existing file to which the temporary file is added is identified by the filename created upon receipt of the first scan-key-oriented event in S19.

Figure 3:
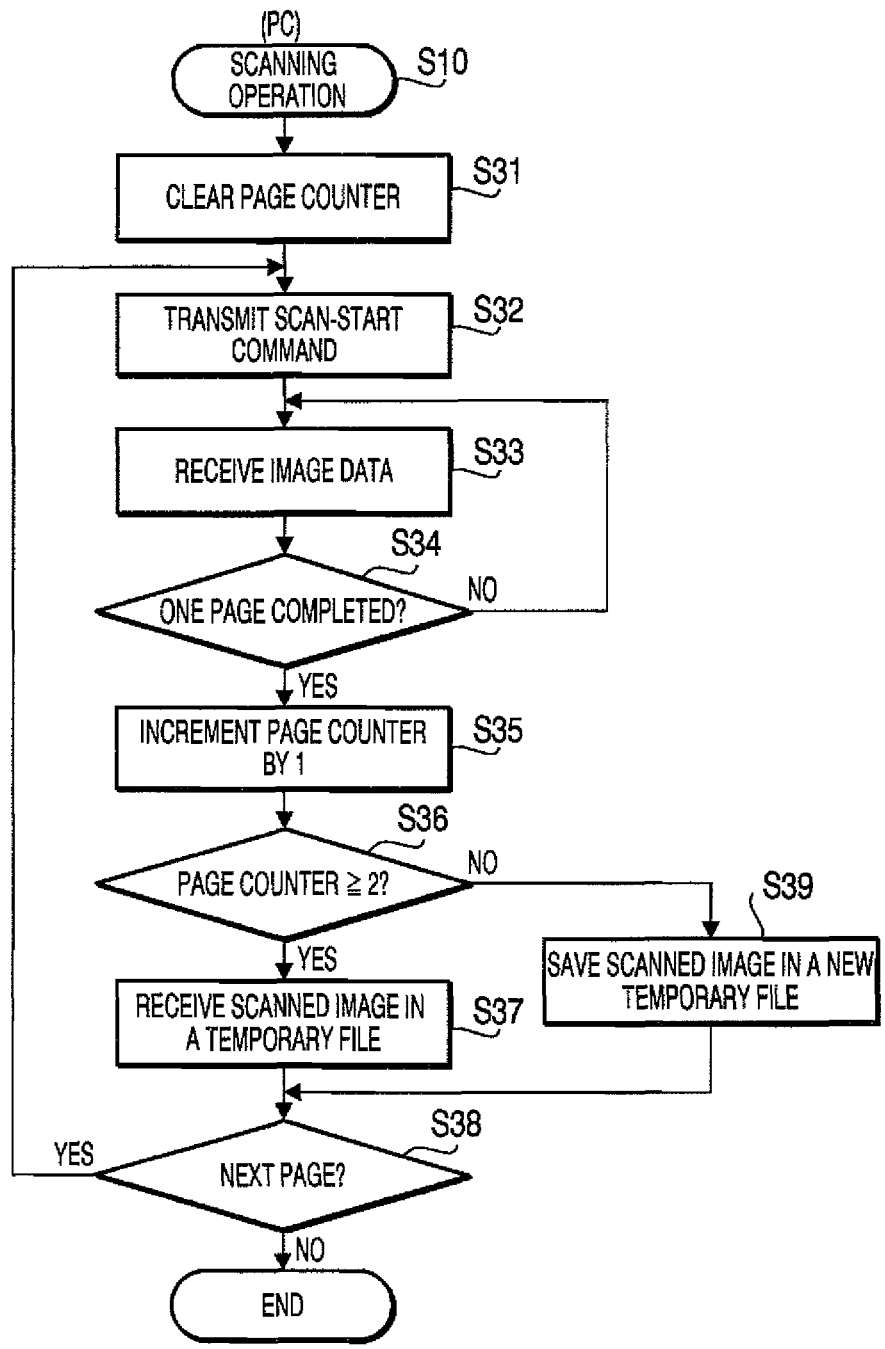
FIG. 3 is a flowchart to illustrate a scanning operation in the PC 10 according to the embodiment of the present invention.

Next, a flow of the scanning operation activated in S10 will be described with reference to FIG. 3. In the scanning operation starts, in S31, the CPU 11 clears the page counter 13e to zero. Thereafter, in S32, the CPU 11 transmits a command to start scanning an image to the trigger scanner, which is one of the image scanners 201, 202. The trigger scanner starts scanning one page to read the image formed thereon and generates image data representing the read image.

In S33, the CPU 11 receives the raster image data, transmitted from the trigger scanner, representing the scanned image either in lines or in blocks. In S34, it is judged as to whether the image data for the whole page is received. When receipt of the image data for the whole page is incomplete (S34: NO), the flow returns to S33, and the CPU 11 continues receiving the image data.

When the image data for the whole page is received (S34: YES), in S35, the CPU 11 increments the page counter 13e by 1. In S36, it is judged as to whether the value in the page counter 13e indicates 2 or a larger number. If the value in the page counter 13e indicates 1 (S36: NO), in S39, the image data received in S33 is reserved in a predetermined area in the RAM 13 as a new temporary file.

In S36, if the value in the page counter 13e indicates 2 or a larger number (S36: YES), in S37, the image data received in S34 is added to an existing file stored in the file memory 14a to be saved as a multiple-paged file. Following S37 or S39, in S38, it is judged as to whether a next page remains to be scanned. If the trigger scanner is set to scan the image by use of the ADF 24, and a next page to be read remains in the ADF 24 (S38: YES), the flow returns to S32 to repeat S32-S37 for the next page. If no page to be read remains in the ADF 24 (S38: NO), the scanning operation is ended.

Figure 4A:
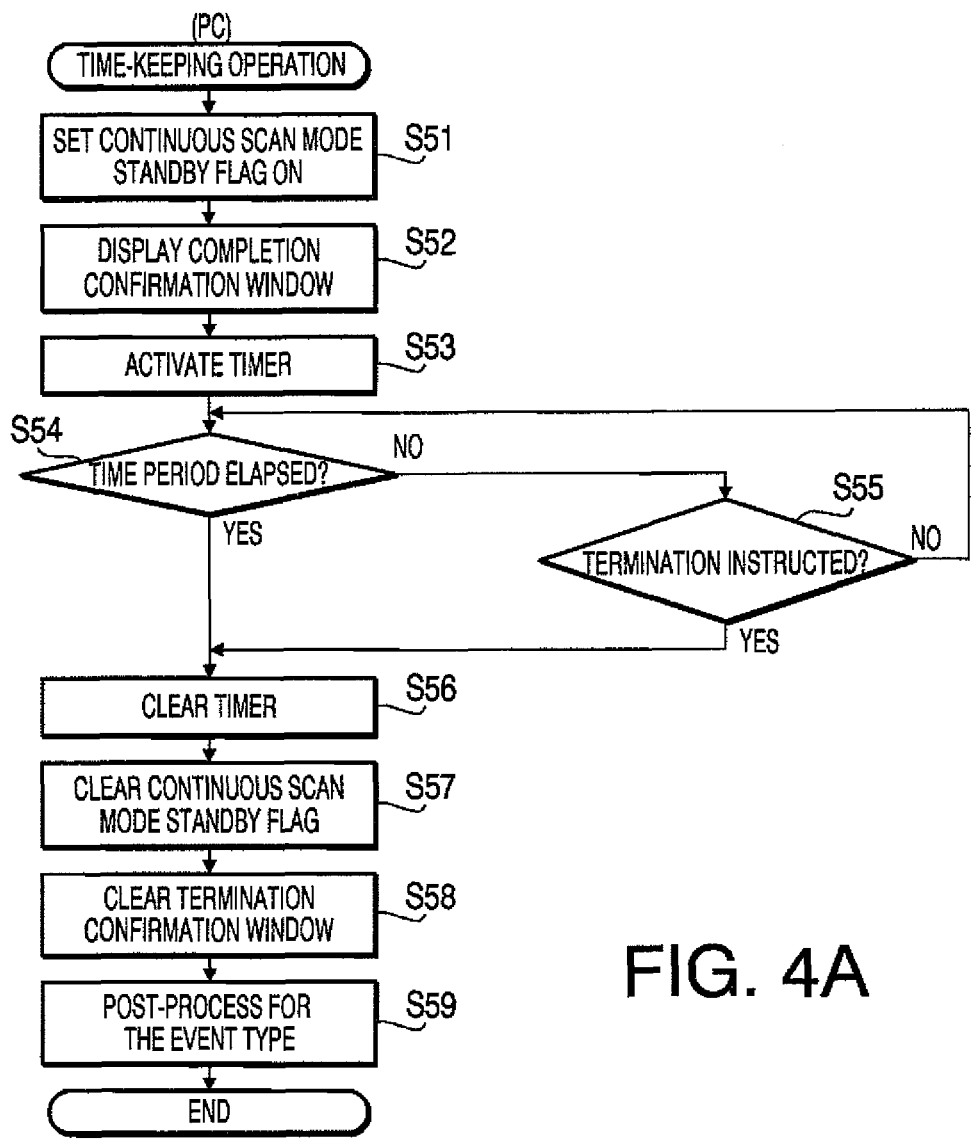
FIG. 4A is a flowchart to illustrate a time-keeping operation in the PC 10 according to the embodiment of the present invention.

Next, the time-keeping operation, which is activated in S11 in the scanner controlling operation, will be described with reference to FIG. 4A.

In the time-keeping operation, in S51, the CPU 11 sets the continuous scan mode standby flag 13b to 1 and shifts the operation mode of the PC 10 to the standby mode. Thereafter, in S52, the CPU 11 displays a termination confirmation window 50 (see FIG. 4B), which is a dialogue box to be presented to the user, in the LCD 16. In S53, the CPU 11 activates a timer to measure a predetermined time period (e.g., 2 minutes).

Figure 4B:
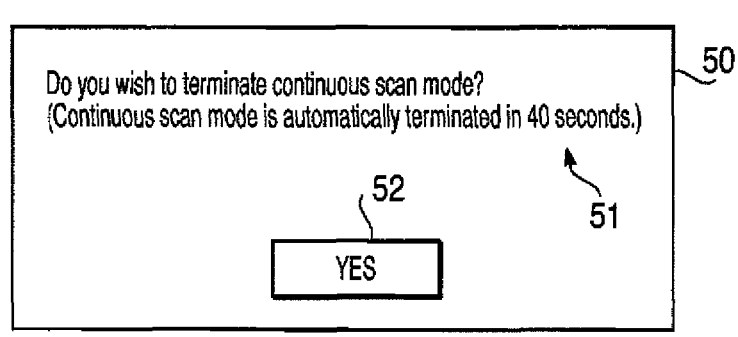
FIG. 4B illustrates a user interface window to be presented to a user in the time-keeping operation according to the embodiment of the present invention.

The termination confirmation window 50 to be displayed in S52 will be described with reference to FIG. 4B. The termination confirmation window 50 includes a message 51, which asks the user as to whether the continuous scan mode is to be forcibly terminated, and a button 52, which is to be pressed by the user to enter the user's instruction for terminating the continuous scan mode in the PC 10.

When the user manipulates the input unit 15 to press the button 52, the instruction to terminate the continuous scan mode is entered in the CPU 11. Further, the message 51 may indicate remaining of the time period before the continuous scan mode is automatically terminated.

Description of the time-keeping operation will be continued. Following S53, in S54, it is judged as to whether the predetermined time period has elapsed. If the predetermined time period has not been elapsed but remains (S54: NO), in S55, it is judged as to whether the user has pressed the button 52 in the termination confirmation window 50 to forcibly terminate the continuous scan mode. If the button 52 has not been pressed (S55: NO), the flow returns to S54.

In S54, if the predetermined time period has elapsed (S54: YES), the flow proceeds to S56. Alternatively, if the predetermined time period has not elapsed (S54: NO), and the user has pressed the button 52 in the termination confirmation window 50 (S55: YES), the flow proceeds to S56. In S56, the CPU 11 clears the timer, and in S57, clears the continuous scan mode standby flag 13b to zero, and cancels the standby mode to release the PC 10 from the standby mode. Thereafter, in S58, the CPU 11 ceases displaying the termination confirmation window 50. Further, in S59, the CPU 11 executes a post-process according to the type of the scan-key-oriented event. The time-keeping operation is ended.

In S59, in particular, if the scan-key-oriented event was caused by the scan key 26b, a window for creating an e-mail, to which the file generated in the scanning operation and including the image data is attached, is displayed in the LCD 16. Meanwhile, if the scan-key-oriented event was caused by the scan key 26a, no particular behavior is taken in the PC 10.

According to the time-keeping operation, when the timer is activated to measure the predetermined time period in S53, the continuous scan mode standby flag 13b is maintained set to 1 within the predetermined time period, and the PC 10 is maintained to operate in the standby mode. Therefore, if a new scan-key-oriented event is received in the PC 10 before the PC 10 exits the standby mode, affirmative judgment is made in S5 (FIG. 2) in the scanner controlling operation, which is activated by the receipt of the new scan-key-oriented event.

Therefore, the second scan-key-oriented event received within the predetermined period starting in S53 is determined to be a continuing scan-key-oriented event continuous from a preceding first scan-key-oriented event.

Meanwhile, if no new scan-key-oriented event is received within the predetermined period, the continuous scan mode standby flag 13b is cleared to zero in S57. Therefore, even if a new scan-key-oriented event received in the PC 10, and the scanner controlling operation is activated by the new scan-key-oriented event, negative judgment is made in S5, and the continuous scan mode is automatically terminated. Thus, when the user stops operating the scan keys 26a, 26b, the continuous scan mode is terminated automatically after expiration of the predetermined time period.

According to the present embodiment, the continuous scan mode can be terminated by the user's input to the button 52 in the termination confirmation window 50. In other words, the continuous scan mode can be terminated manually at the user's desired timing. Further, the termination confirmation window 50 being a dialogue box can effectively present the option of termination to the user so that the user can terminate the continuous scan mode in an easy operation.

According to the present embodiment, when the user terminates the continuous scan mode through the termination confirmation window 50, the user is in the vicinity of the PC 10 to operate the PC 10. Therefore, after termination of the continuous scan mode, the user can stay in the position to continue using the PC 10. When, for example, the user presses the button 52 to terminate the continuous scan mode during the scanner controlling operation, which was activated by the scan key 26*b*, the window for creating an e-mail with the image data file including the scanned image is presented to the user through the LCD 16 of the PC 10. Therefore, the user can remain in the vicinity of the PC 10 to continuously operate the PC 10 in order to finish creating the e-mail and transmit the e-mail to a desired address.

As has been described above, according to the present embodiment, the PC 10 receiving a scan-key-oriented event is automatically shifted in the standby mode, in which the PC 10 stands by to be shifted in the continuous scan mode. Thus, continuity of a plurality of operations to one of the scan keys 26*a*, 26*b* can be determined by the PC 10. When the PC 10 determines that the plurality of operations to the scan key 26*a*/26*b* are "continuous," the image data generated in the continuous scanning operations are combined into a multiple-paged file.

Therefore, the user can operate one of the scan keys 26*a*, 26*b* each time a page having the image to be read is scanned without being concerned about a manual procedure to combine the plurality of images into a single multiple-paged file.

Further, even the images scanned by the image scanner 202, which does not have an ADF, can be bundled in a multiple-paged file. Furthermore, even the images formed on a plurality of sheets (e.g., pages in a book) which cannot be fed by the ADF 24 can be bundled in a multiple-paged file. A volume of the sheets which can be fed by the ADF 24 may be limited, but when images formed on sheets which exceed the volume acceptable for the ADF 24 are scanned, the sheets may require to be divided into several smaller volumes. According to the present embodiment, the divided volumes can be bundled in a single multiple-paged file.

In this regard, the configuration of the image scanners 201, 202 is not required to be modified in order to accept the larger volume of sheets to be scanned; therefore, no additional parts for the image scanners 201, 202 are required, and manufacturing cost for the image scanners 201, 202 can be avoided from being increased.

According to the present embodiment, the standby mode is activated automatically each time the user operates the scan keys 26*a*, 26*b*; therefore, the user is not required to switch his/her locations between the PC 10 and the image scanner 201/202. Thus, the user can stay in the vicinity of the image scanner 201/202 to operate the scan key 26*a*/26*b* and exchange the document sheets to be read by the image scanner 201/202.

According to the present embodiment, further, a current scan-key-oriented event is determined to be a scan-key-oriented event continuous from a preceding first scan-key-oriented event if a trigger scanner issuing the current scan-key-oriented event, which is received in the PC 10 operating in the standby mode, is identical to a trigger scanner issuing the preceding first scan-key-oriented. Therefore, even when a new scan-key-oriented event occurs in a different image scanner between the preceding first scan-key-oriented event and the continuous scan-key-oriented event, the image data generated by the intervening second scan-key-oriented event is saved in a new data file, and the intervening image data can be prevented from being included in the multiple-paged file created by the first scan-key-oriented event and the continuous scan-key-oriented event.

Furthermore, the current scan-key-oriented event is determined to be a scan-key-oriented event continuous from the preceding first scan-key-oriented event if a type of the scan-key-oriented event received in the PC 10 operating in the standby mode is identical to a type of the preceding first scan-key-oriented event. Therefore, when the image data is generated by a scan-key-oriented event, of which event type is different from an event type of the preceding first scan-key-oriented event, the image data is included in a separate data file from the data file including the image data generated by the preceding first scan-key-oriented event and is prevented from being included in the same data file.

Although an example of carrying out the invention has been described, those skilled in the art will appreciate that there are numerous variations and permutations of the method to read images and a computer readable storage medium that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in S11 in the scanner controlling operation, the time-keeping operation, in which the continuous scan mode standby flag 13*b* is set to 1 each time a scan-key-oriented event is received in the PC 10, is activated in order to maintain the PC 10 in the standby mode.

However, the time-keeping operation can be omitted; instead, the continuous scan mode flag 13*c* can be set upon receipt of a first scan-key-oriented event in order to switch the PC 10 in the continuous scan mode. That is, in S5, in place of examining as to whether the continuous scan mode standby flag 13*b* is set to 1, the CPU 11 examines as to whether the continuous scan mode flag 13*c* is set to 1. Further, when negative judgment is made in one of S5, S6, and S7, in S18, the continuous scan mode flag 13*c* is set to 1. According to this operation flow, the time-keeping operation can be omitted. Further, behaviors of the CPU 11 in S8 and S12 can be omitted.

Moreover, according to the above operation flow, the operation of the PC 10 is configured such that the continuous scan mode can be terminated solely by the user's input through the termination confirmation window 50. That is, the continuous scan mode activated by the continuous scan mode flag 13*c*, which was set to 1 upon receipt of the first scan-key-oriented event, is maintained until the button 52 in the termination confirmation window 50 shown in the LCD 16 is operated by the user.

Specifically, when negative judgment is made in one of S5, in which the continuous scan mode flag 13 in place of the continuous scan mode standby flag 13*b c* is referred to, S6, and S7, the continuous scan mode flag 13*c* is set to 1 in S18, and the termination confirmation window 50 is displayed in the LCD 16. Thereafter, following one of S14 and S20, it is examined as to whether the button 52 was operated. When the button 52 was operated, the continuous can mode flag 13*c* is cleared to zero, and the termination confirmation window 50 is cleared off from the LCD 16. The scanner controlling operation is ended thereafter. When the button 52 was not operated, the continuous scan mode flag 13*c* is maintained at 1, and the scanner controlling operation is ended. When the time-keeping operation is thus omitted, the behavior of the CPU 11 in S59, which was performed in the time-keeping operation, is performed after entry of the operation to the button 52 and prior to termination of the scanner controlling operation.

For another example, upon receipt of a first scan-key-oriented event, the continuous scan mode standby flag 13*b* may be set to 1 in order to shift the PC 10 to the standby mode rather than setting the continuous scan mode flag 13*c* to 1 in order to shift the PC 10 to the continuous scan mode. According to this operation flow, similarly to the above modification, in S5, in place of examining as to whether the continuous scan mode standby flag 13*b* is set to 1, the CPU 11 examines as to whether the continuous scan mode flag 13*c* is set to 1. Further in S12, in place of referring to the continuous scan mode flag 13*c*, the CPU 11 examines as to whether the continuous scan mode standby flag 13*b* is set to 1.

For another example, the time-keeping operation is activated following the scanning operation in S10. However, the time-keeping operation may not necessarily be activated following the scanning operation in S10, but may be activated at different timings as long as the time-keeping operation is activated upon receipt of each scan-key-oriented event. In general, nevertheless, length of time required to complete the scanning operation is inconstant and variable; therefore, it is effective that the time-keeping operation is activated following the scanning operation.

In the embodiment described above, a type of the event of a first scan-key-oriented event is stored in the event information memory 13*a* so that the identification of a trigger scanner and the event type of the first scan-key-oriented event are compared with identification and an event type of a succeeding scan-key-oriented event in S6 and S7. Alternatively, information in the event information memory 13*a* may be updated each time a scan-key-oriented event is received in the PC 10, and the identification and the event type of the succeeding scan-key-oriented event can be compared with the updated information of the preceding scan-key-oriented event in the event information memory 13*a*.

For another example, in the above embodiment, the temporary image data reserved in the scanning operation (S10) in the temporary file is added to an existing file in S14. Alternatively, the image data generated in the scanning operation when the PC 10 is in the continuous scan mode may be stored in the RAM 13 so that the image data accumulated in the RAM 13 may be bundled in a multiple-paged file when the PC 10 exits the standby mode of the continuous scan mode.

For another example, in the above embodiment, the termination confirmation window 50 is presented to the user through the LCD 16 in order to have the standby mode terminated. Alternatively or additionally, the standby mode may be terminated upon entry of a predetermined operation (e.g., operation to a predetermined key in the keyboard of the PC 10).

What is claimed is:

1. A method to create a data file in a controller device connected to an image reading apparatus which reads an image formed on a recording medium and generates image data representing the image on basis of an instruction inputted in the image reading apparatus by a user, the data file containing the image data, comprising:

receiving an event signal generated in the image reading apparatus based on the instruction inputted in the image reading apparatus;

obtaining the image data generated in the image reading apparatus in accordance with the receipt of the event signal;

judging whether the received event signal is a first event signal in the controller device;

setting the controller device to operate in a predetermined operation mode, in which the controller device stands by for a sequential event signal, when judgment is made that the received event signal is a first event signal from the image reading apparatus, the sequential event signal being an event signal sequentially obtained from the first event signal and sequentially generated in the image reading apparatus, the sequential event signal including identifying information to identify the image reading apparatus which is an origin of the sequential event signal;

storing the image data obtained from the image reading apparatus in accordance with the receipt of the first event signal in a storage area;

creating a data file containing the image data stored in the storage area;

judging, when the received event signal is a non-first event signal received from the image reading apparatus in the controller device operating in the predetermined operation mode, whether the received non-first event signal is the sequential event signal based on the identifying information included in the received first event signal and the identifying information included in the received non-first event signal;

adding, when judgment is made that the received non-first event signal is the sequential event signal from the image reading apparatus, the image data obtained from the image reading apparatus in accordance with the receipt of the non-first event signal to the image data contained in the created data file and updating the created data file as a single multiple-paged data file containing the image data obtained in accordance with the receipt of the first event signal and the image data obtained in accordance with the receipt of the non-first event signal;

activating a timer to measure a predetermined time period at a predetermined time point after the receipt of the event signal, the timer located in the controller device; and releasing the controller device from the predetermined operation mode when a terminating event occurs, wherein the terminating event occurs when the predetermined time period elapses whilst the controller device operates in the predetermined operation mode without receiving a new event signal.

2. The method according to claim 1, further comprising:
releasing the controller device from the predetermined operation mode when a terminating event occurs,
wherein the terminating event occurs when a predetermined terminating instruction is entered in the controller device.

3. The method according to claim 2, further comprising:
presenting an instruction entry interface, through which the predetermined terminating instruction can be entered, to the user when the controller device is operating in the predetermined operation mode,
wherein the terminating event occurs when the predetermined terminating instruction is entered by the user through the instruction entry interface.

4. The method according to claim 1, further comprising:
assigning an identifying name to the image data obtained from the image reading apparatus in accordance with the receipt of the first event signal and stored in the storage area when the judgment is made that the received event signal is a first event signal; and identifying the image data obtained from the image reading apparatus in accordance with the receipt of the first event signal by the assigned identifying name and adding the image data obtained from the image reading apparatus in accordance with the receipt of the non-first event signal to the identified image data contained in the created data file when judgment is made that the non-first event signal is the sequential event signal sequentially obtained from the first event signal.

5. The method according to claim 1, wherein the event signal includes information concerning the image reading apparatus, in which a current instruction inputted by the user to read the image is entered;

wherein the method further comprises:

extracting the information concerning the image reading apparatus from the event signal when the event signal is received; and comparing the extracted information with previously extracted information concerning an image reading apparatus, in which a preceding instruction inputted by the user to read an image is entered, the previously extracted information extracted from an event signal generated on basis of the preceding instruction, wherein the judgment is made that the non-first event signal received in the controller device operating in the predetermined operation mode is the sequential event signal sequentially obtained from the first event signal generated in accordance with the preceding instruction when the image reading apparatus in which the current instruction is entered is determined to be identical to the image reading apparatus in which the preceding instruction is entered based on the comparison of the information extracted from the event signals.

6. The method according to claim 1, wherein the event signal includes information concerning a type of a current instruction;

wherein the method further comprises:

extracting the information concerning the type of the current instruction from the event signal; and comparing the extracted information with previously extracted information concerning a type of a preceding instruction, the previously extracted information extracted from an event signal generated on basis of the preceding instruction, wherein the judgment is made that the non-first event signal received in the controller device operating in the predetermined operation mode is the sequential event signal sequentially obtained from the first event signal generated in accordance with the preceding instruction when the type of the current instruction is identical to the type of the preceding instruction based on the comparison of the information extracted from the event signals.

7. A non-transitory computer readable medium storing computer readable instructions that manipulate a controller device, which is connected to an image reading apparatus to read an image formed on a recording medium and generate image data representing the image on basis of an instruction inputted in the image reading apparatus by a user, to create a data file containing the image data, comprising steps of:

receiving an event signal generated in the image reading apparatus based on the instruction inputted in the image reading apparatus;

obtaining the image data generated in the image reading apparatus in accordance with the receipt of the event signal;

judging whether the received event signal is a first event signal in the controller device;

setting the controller device to operate in a predetermined operation mode, in which the controller device stands by for a sequential event signal, when judgment is made that the received event signal is a first event signal from the image reading apparatus, the sequential event signal being an event signal sequentially obtained from the first event signal and sequentially generated in the image reading apparatus, the sequential event signal including identifying information to identify the image reading apparatus which is an origin of the sequential event signal;

storing the image data obtained from the image reading apparatus in accordance with the receipt of the first event signal in a storage area;

creating a data file containing the image data stored in the storage area;

judging, when the received event signal is a non-first event signal received from the image reading apparatus in the controller device operating in the predetermined operation mode, whether the received non-first event signal is the sequential event signal based on the identifying information included in the received first event signal and the identifying information included in the received non-first event signal;

adding, when judgment is made that the received non-first event signal is the sequential event signal from the image reading apparatus, the image data obtained from the image reading apparatus in accordance with the receipt of the non-first event signal to the image data contained in the created data file and updating the created data file as a single multiple-paged data file containing the image data obtained in accordance with the receipt of the first event signal and the image data obtained in accordance with the receipt of the non-first event signal;

activating a timer to measure a predetermined time period at a predetermined time point after the receipt of the event signal, the timer located in the controller device; and releasing the controller device from the redetermined operation mode when a terminating event occurs, wherein the terminating event occurs when the predetermined time period elapses whilst the controller device operates in the predetermined operation mode without receiving a new event signal.

* * * * *